United States Patent
Zhang et al.

(10) Patent No.: US 12,511,449 B1
(45) Date of Patent: Dec. 30, 2025

(54) SURFACE TOPOGRAPHY RECONSTRUCTION METHOD AND SYSTEM INTEGRATING MACHINE LEARNING AND SPATIAL FREQUENCY ANALYSIS

(71) Applicant: Shanghai Jiao Tong University, Shanghai (CN)

(72) Inventors: Zhinan Zhang, Shanghai (CN); Nian Yin, Shanghai (CN); Zishuai Wu, Shanghai (CN)

(73) Assignee: Shanghai Jiao Tong University, Shanghai (CN)

( * ) Notice: Subject to any disclaimer, the term of this patent is extended or adjusted under 35 U.S.C. 154(b) by 0 days.

(21) Appl. No.: 19/174,940

(22) Filed: Apr. 10, 2025

(30) Foreign Application Priority Data

Jun. 26, 2024 (CN) .......................... 202410837582.2

(51) Int. Cl.
  *G06F 30/13* (2020.01)
  *G01B 11/24* (2006.01)
  *G01B 11/30* (2006.01)

(52) U.S. Cl.
  CPC .......... *G06F 30/13* (2020.01); *G01B 11/2441* (2013.01); *G01B 11/303* (2013.01)

(58) Field of Classification Search
  CPC ..... G06F 30/13; G06F 30/00; G01B 11/2441; G01B 11/303
  (Continued)

(56) References Cited

U.S. PATENT DOCUMENTS 11,816,767 B1   11/2023   Tian et al.

FOREIGN PATENT DOCUMENTS

CN   105066907 A     11/2015
CN   106021661 A  *  10/2016   ............. G06F 30/20
(Continued)

OTHER PUBLICATIONS

Zhuolin Li, Research on the Polishing Characteristics of Optical Surface for Ceramic and Metal Materials, Changchun University of Science and Technology, 2018, pp. 1-99.

(Continued)

*Primary Examiner* — Cedric Johnson
(74) *Attorney, Agent, or Firm* — Bayramoglu Law Offices LLC

(57) ABSTRACT

A surface topography reconstruction method integrating machine learning and spatial frequency analysis includes step 1: Using the analytical formula of the spatial frequency method to generate a large number of two-dimensional arrays that symbolize rough surfaces; step 2: by analyzing the height distribution and the frequency energy ratio of the generated surface, combined with the machine learning method, extracting the characteristic variable of the analytical formula; step 3: integrating the test or the simulation method to establish the relationship between the characteristic parameter and the surface property for performance prediction and surface reconstruction in a specific scenario. The surface topography reconstruction method can realize the surface topography characteristic extraction based on the spatial frequency analysis method, and reconstruct the rough surface suitable for the current-carrying performance prediction, thereby improving the practical significance of the surface reconstruction method in performance prediction.

3 Claims, 4 Drawing Sheets

(58) Field of Classification Search
USPC .................................................. 703/14, 13
See application file for complete search history.

(56) References Cited

FOREIGN PATENT DOCUMENTS

| CN | 113051647 A | * | 6/2021 | ............ | G01B 11/24 |
| CN | 113145905 A | | 7/2021 | | |
| CN | 116992769 A | | 11/2023 | | |
| WO | WO-2019087032 A1 | * | 5/2019 | ............ | G06F 30/17 |

OTHER PUBLICATIONS

Nian Yin et al., Tribo-informatics approaches in tribology research: A review, Friction, 2023, pp. 1-22, vol. 1, Springer.

\* cited by examiner

SURFACE TOPOGRAPHY RECONSTRUCTION METHOD AND SYSTEM INTEGRATING MACHINE LEARNING AND SPATIAL FREQUENCY ANALYSIS

CROSS REFERENCE TO THE RELATED APPLICATIONS

This application is based upon and claims priority to Chinese Patent Application No. 202410837582.2, filed on Jun. 26, 2024, the entire contents of which are incorporated herein by reference.

TECHNICAL FIELD

The invention relates to the field of surface topography reconstruction technology, specifically, it relates to a surface topography reconstruction method and system integrating machine learning and spatial frequency analysis.

BACKGROUND

The morphology of the contact surface directly affects the physical and chemical properties of the material, which in turn affects the macroscopic performance of the machine or system. At the macro-scale, surface morphology reconstruction is of great significance for understanding tribological properties, wettability, and catalytic activity; at the micro-scale, surface morphology reconstruction also plays a key role in the functionality and stability of nanodevices. In addition, understanding and controlling the surface reconstruction process helps to optimize the manufacturing and processing of materials and improve their performance in high-performance applications.

Surface topography reconstruction is usually divided into reconstruction based on statistical methods and reconstruction based on analytical formulas. Among them, the reconstruction based on statistical methods uses statistics (such as surface roughness, peak and trough distribution, etc.) to describe and generate surface topography. In contrast, the reconstruction based on analytical formulas depends on specific mathematical models and formulas to simulate the change in surface topography. However, the reconstruction method based on statistical methods lacks the physical explanation of the formation mechanism of surface topography, and cannot effectively identify the micro-characteristics of surface topography, especially the curvature characteristics of asperities. It leads to the low accuracy of the reconstructed surface in predicting the current-carrying performance and other performances sensitive to the curvature of the asperity.

At present, the spatial frequency analysis method provides a new idea for the spatial reconstruction of rough surfaces, by adjusting the proportion of high-frequency and low-frequency components and the amplitude factor of the overall fluctuation in the spatial frequency method, the rough surface reconstruction under different spatial frequency characteristic parameters can be realized. However, due to the addition of random variables, it is difficult to extract the characteristic parameters from the actual rough surface, which restricts the application of the spatial frequency analysis method.

The patent document CN106021661A discloses a surface analysis, simulation, and reconstruction system, that solves the problems of surface analysis, simulation, and reconstruction; the surface analysis module is composed of five sub-modules: surface input, multi-scale surface analysis, roughness surface analysis, data display and data output, which realizes the analysis function of the user-specified surface alone; the surface simulation module is composed of six sub-modules: surface parameter and function input, roughness surface simulation, roughness surface error analysis, multi-scale surface simulation, multi-scale surface error analysis and data output, the surface analysis and surface simulation module are combined to realize the reconstruction function of the user-specified surface. However, the patent cannot completely solve the current technical problems and cannot meet the needs of the invention.

SUMMARY

Because of the defects in the existing technology, the purpose of this invention is to provide a surface topography reconstruction method and system integrating machine learning and spatial frequency analysis.

According to the surface topography reconstruction method integrating machine learning and spatial frequency analysis provided by the invention, the following steps are included:

step 1: using an analytical formula of a spatial frequency method to generate a large number of two-dimensional arrays that symbolize rough surfaces;

step 2: by analyzing a height distribution and a frequency energy ratio of a generated surface, combined with the machine learning method, extracting a characteristic variable of the analytical formula;

step 3: integrating a test or a simulation method to establish a relationship between a characteristic parameter and a surface property for performance prediction and surface reconstruction in a specific scenario.

Preferably, Step 1 Includes:

According to a basic formula of the spatial frequency method, determining a cutoff frequency N, a spectral index b and a gain factor A of a spatial frequency, and a two-dimensional function is $$f(x, y) = A \cdot \sum_{m=-N}^{N} \sum_{n=-N}^{N} g(m, n) \cdot \frac{1}{(m^2 + n^2)^{\beta/2}} \cos(2\pi(mx + ny) + u(m, n))$$

where g(m,n) is a normal distribution function with a mean of 0 and a standard deviation of 1; u(x,y) is a uniform distribution function on [0, 2π]; x,y denotes a coordinate in x and y directions corresponding to any point on the rough surface; m,n denote spatial frequency values in the x and y directions superimposed at any point on the rough surface, namely, m and n; β indicates an attenuation factor of amplitude with frequency in a spectrogram;

setting three characteristic parameters of N, b, and A arbitrarily to generate a surface topography, including a two-dimensional grayscale image and a three-dimensional topography image;

in a set interval of the surface topography, generating a characteristic parameter combination of [N0, b0, A0] randomly, and generating the two-dimensional array of the rough surface accordingly.

Preferably, Step 2 Includes:

for a generated two-dimensional array, extracting a height distribution map;

extracting full widths corresponding to height lines of 95%, 90%, 85%, 80%, 75%, 70%, 65%, 60%, 55%, 50%, 45%, 40%, 35%, 30%, 25%, 20%, 15%, 10% and 5% in the height distribution map to form a first one-dimensional array of (1,19);

using a two-dimensional Fourier transform method, drawing a two-dimensional spectrum corresponding to the two-dimensional array of the rough surface, for a two-dimensional function f(x,y), its two-dimensional Fourier transform F(u,v) is $$F(u,v) \times \int_{-\infty}^{\infty} \int_{-28}^{\infty} f(x,y) e^{-i2\pi(ux+vy)} dx dy$$

where, (x,y) is a coordinate in a spatial domain; (u,v) is a coordinate in a frequency domain; $e^{-i2\pi(ux+vy)}$ is a transformation kernel, denoting a complex form of rotation;

taking an origin of (0,0) in the two-dimensional spectrum as a center, extracting radii corresponding to extraction energy ratios of 95%, 90%, 85%, 80%, 75%, 70%, 65%, 60%, 55%, 50%, 45%, 40%, 35%, 30%, 25%, 20%, 15%, 10% and 5% to form a second one-dimensional array of (1,19);

composing an energy ratio and a corresponding radius to (x, y), using a spline curve to fit the continuous curve, and extracting a radius change rate of at corresponding position to form a third one-dimensional array of (1,19);

allowing three one-dimensional arrays to be formed into a one-dimensional array, and obtaining an array [N, b, A] corresponding to the one-dimensional array;

using a regression method to train a model, an input of the model is a one-dimensional array with a (1,57) shape, corresponding to height and spectral characteristics of the surface topography, an output of the model is a one-dimensional array with a (1,3) shape, corresponding to spatial frequency characteristic parameters of the surface.

Preferably, a square logarithmic error is used as a loss function of the model; a number of decision trees in the model is 500, and a maximum depth of each tree is 10; a learning rate of the model is 0.05.

Preferably, measuring a static contact resistance by integrating a structure, material, and contact form characteristics of an electrical contact interface to be predicted, and obtaining the surface morphology of a contact point by using a white light interferometer and a three-dimensional profilometer, storing the surface morphology of the contact point in a two-dimensional array of 200*200, and formed data pairs are (static contact resistance, spatial frequency characteristic parameters of the rough surface);

using a trained model to extract a characteristic parameter (N, b, A) of a real rough surface, and using the machine learning regression method again to train a correlation model between these three characteristic parameters and the static contact resistance, an input of the correlation model is the spatial frequency characteristic parameter of the rough surface, and the output is the static contact resistance of the interface.

According to the surface topography reconstruction system integrating machine learning and spatial frequency analysis provided by the invention, includes:

module M1: the analytical formula of the spatial frequency method is used to generate a large number of two-dimensional arrays that symbolize rough surfaces;

module M2: by analyzing the height distribution and the frequency energy ratio of the generated surface, combined with the machine learning method, the characteristic variable of the analytical formula is extracted;

module M3: a test or a simulation method are integrated to establish the relationship between the characteristic parameter and the surface property for performance prediction and surface reconstruction in a specific scenario.

Preferably, module M1 includes:

According to the basic formula of the spatial frequency method, the cutoff frequency N, the spectral index b, and the gain factor A of the spatial frequency are determined, and the two-dimensional function is $$f(x, y) = A \cdot \sum_{m=-N}^{N} \sum_{n=-N}^{N} g(m, n) \cdot \frac{1}{(m^2 + n^2)^{\beta/2}} \cos(2\pi(mx + ny) + u(m, n))$$

where g (m,n) is the normal distribution function with a mean of 0 and a standard deviation of 1; u(x,y) is the uniform distribution function on [0, 2π]; x,y denotes the coordinate in x and y directions corresponding to any point on the rough surface; m,n denote the spatial frequency values in the x and y directions superimposed at any point on the rough surface, namely, m and n; β indicates the attenuation factor of amplitude with frequency in the spectrogram;

three characteristic parameters of N, b, and A arbitrarily are set to generate a surface topography, including a two-dimensional grayscale image and a three-dimensional topography image;

in the set interval of the surface topography, the characteristic parameter combination of [N0, b0, A0] is generated randomly, and the two-dimensional array of the rough surface is generated accordingly.

Preferably, module M2 includes:

for the generated two-dimensional array, the height distribution map is extracted;

the full widths corresponding to height lines of 95%, 90%, 85%, 80%, 75%, 70%, 65%, 60%, 55%, 50%, 45%, 40%, 35%, 30%, 25%, 20%, 15%, 10% and 5% in the height distribution map are extracted to form the first one-dimensional array of (1,19);

the two-dimensional Fourier transform method is used, the two-dimensional spectrum corresponding to the two-dimensional array of the rough surface is drawn, for a two-dimensional function f(x,y), its two-dimensional Fourier transform F(u,v) is $$F(u,v) \times \int_{-\infty}^{\infty} \int_{-28}^{\infty} f(x,y) e^{-i2\pi(ux+vy)} dx dy$$

where (x,y) is the coordinate in the spatial domain; (u,v) is the coordinate in the frequency domain; $e^{-i2\pi(ux+vy)}$ is the transformation kernel, denoting the complex form of rotation;

the origin of (0,0) is taken in the two-dimensional spectrum as a center, the radii corresponding to extraction energy ratios of 95%, 90%, 85%, 80%, 75%, 70%, 65%, 60%, 55%, 50%, 45%, 40%, 35%, 30%, 25%, 20%, 15%, 10%, and 5% are extracted to form a second one-dimensional array of (1,19);

the energy ratio and the corresponding radius are composed to (x, y), the spline curve is used to fit the continuous curve, and the radius change rate of the corresponding position is extracted to form the third one-dimensional array of (1,19);

three one-dimensional arrays are formed into a one-dimensional array, and an array [N, b, A] corresponding to the one-dimensional array is obtained;

the regression method is used to train the model, the input of the model is a one-dimensional array with a (1,57) shape, corresponding to the height and spectral characteristics of the surface topography, and the output of the model is a one-dimensional array with a (1,3) shape, corresponding to the spatial frequency characteristic parameter of the surface.

Preferably, the square logarithmic error is used as the loss function of the model; a number of decision trees in the model is 500, and the maximum depth of each tree is 10; the learning rate of the model is 0.05.

Preferably, the static contact resistance is measured by integrating the structure, the material and the contact form characteristics of the electrical contact interface to be predicted, and the surface morphology of the contact point is obtained by using a white light interferometer and a three-dimensional profilometer, the surface morphology of the contact point is stored in a two-dimensional array of 200*200, and formed data pairs are (static contact resistance, spatial frequency characteristic parameter of the rough surface);

the trained model is used to extract a characteristic parameter (N, b, A) of the real rough surface, and the machine learning regression method is used again to train the correlation model between these three characteristic parameters and the static contact resistance, the input of the correlation model is the spatial frequency characteristic parameter of the rough surface, and the output is the static contact resistance of the interface.

Compared with the existing technology, the invention has the following beneficial effects:

(1) The invention mainly solves the problem that the current surface reconstruction methods based on statistical methods (such as roughness, kurtosis, and skewness) are not accurate in predicting the service performance (mainly including current-carrying performance, wettability performance, optical properties, friction and wear performance) of electrical connectors, conductive slip rings, solar panels, and transmission friction pairs; the invention can extract the spatial frequency characteristic parameters of any actual rough surface, reconstruct the similar surface and predict the current-carrying performance, which greatly improves the reconstruction accuracy of the rough surface and enriches the physical connotation of the characteristic parameters, at the same time, the proposed surface reconstruction method is used to support the generation and analysis of the wear morphology of the friction and wear test system, and to solve the problem of in-situ test of wear morphology.

(2) The invention provides a surface topography reconstruction method and system integrating machine learning and spatial frequency analysis, which is mainly used for characteristic extraction and morphology reconstruction of rough surfaces, and improves the prediction ability of the reconstructed surface for current-carrying, wettability, optical, friction and wear properties. The purpose of the invention is to establish a mathematical relationship between surface morphology and performances, and then realize the mapping from surface characteristic analysis to macroscopic current-carrying performance, so as to solve the problem of low accuracy caused by the current statistical characteristics of the surface to predict its current-carrying, wettability, optical and other properties.

(3) The invention can realize the surface topography characteristic extraction based on the spatial frequency analysis method, and reconstruct the rough surface suitable for the current-carrying performance prediction, thereby improving the practical significance of the surface reconstruction method in the performance prediction. Fast and accurate characteristic extraction can be performed on any actual surface, which improves the integration of the tool.

BRIEF DESCRIPTION OF THE DRAWINGS

By reading a detailed description of the non-restrictive embodiment concerning the following drawings, the other characteristics, purposes, and advantages of the invention will become more apparent.

DETAILED DESCRIPTION OF THE EMBODIMENTS

The following is a detailed description of the invention in combination with specific embodiments. The following embodiments will help technicians in the field to further understand the invention, but do not restrict the invention in any way. It should be pointed out that for the ordinary technical personnel in this field, some changes and improvements can be made without breaking away from the idea of the invention. These are all within the scope of protection of the invention.

Embodiment 1

The invention provides a surface topography reconstruction method integrating machine learning and spatial frequency analysis, firstly, the analytical formula of the spatial frequency method is used to generate a large number of two-dimensional arrays that symbolize rough surfaces; by analyzing the height distribution and frequency energy ratio of the generated surface, combined with the machine learning method, the characteristic variables of the analytical formula are extracted; finally, the relationship between characteristic parameters and surface properties is established by integrating experimental or simulation methods for performance prediction and surface reconstruction in specific scenarios.

Figure 1:
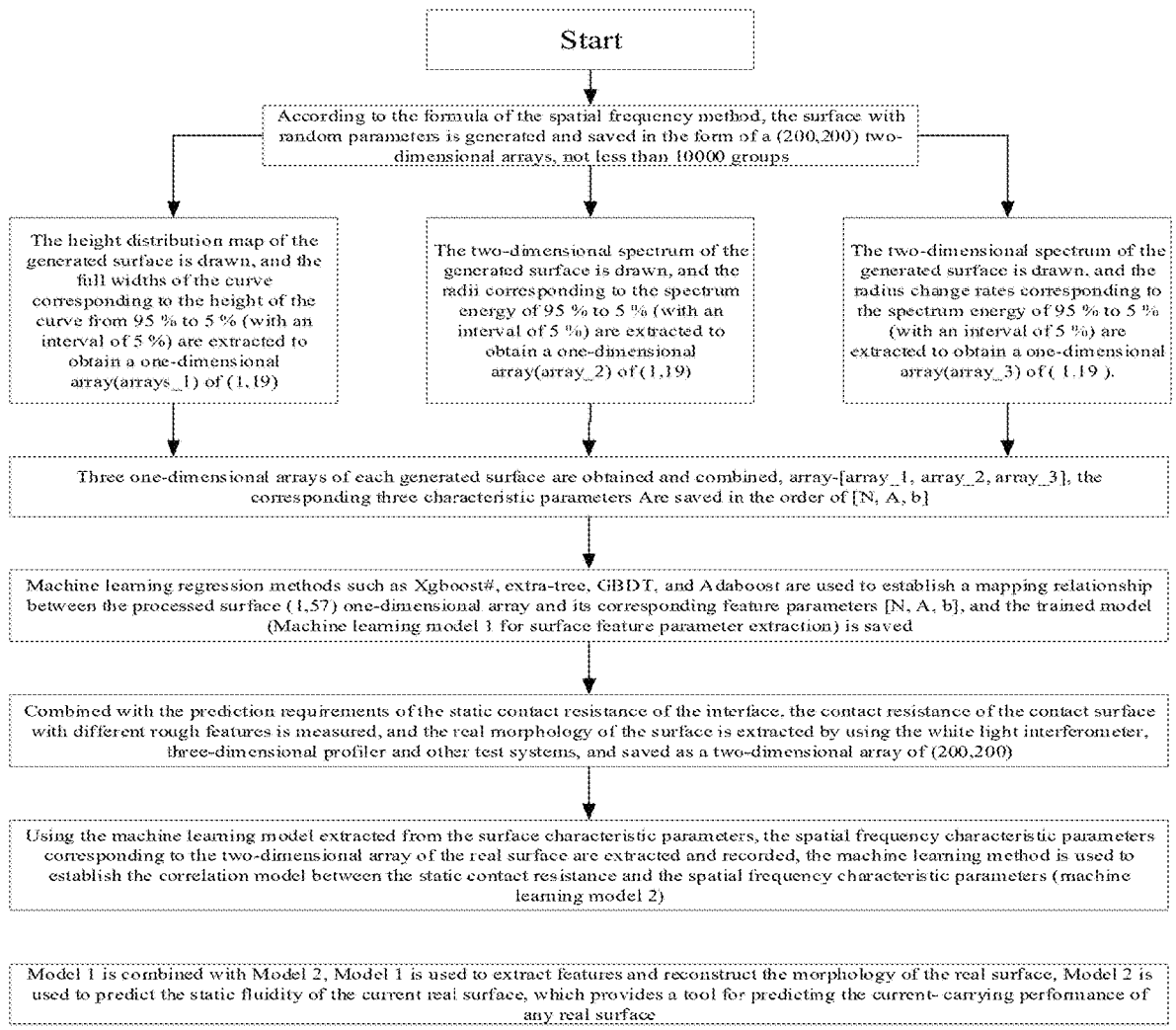
FIG. 1 is a workflow chart of surface topography reconstruction based on the fusion of machine learning and spatial frequency analysis.
Figure 2:
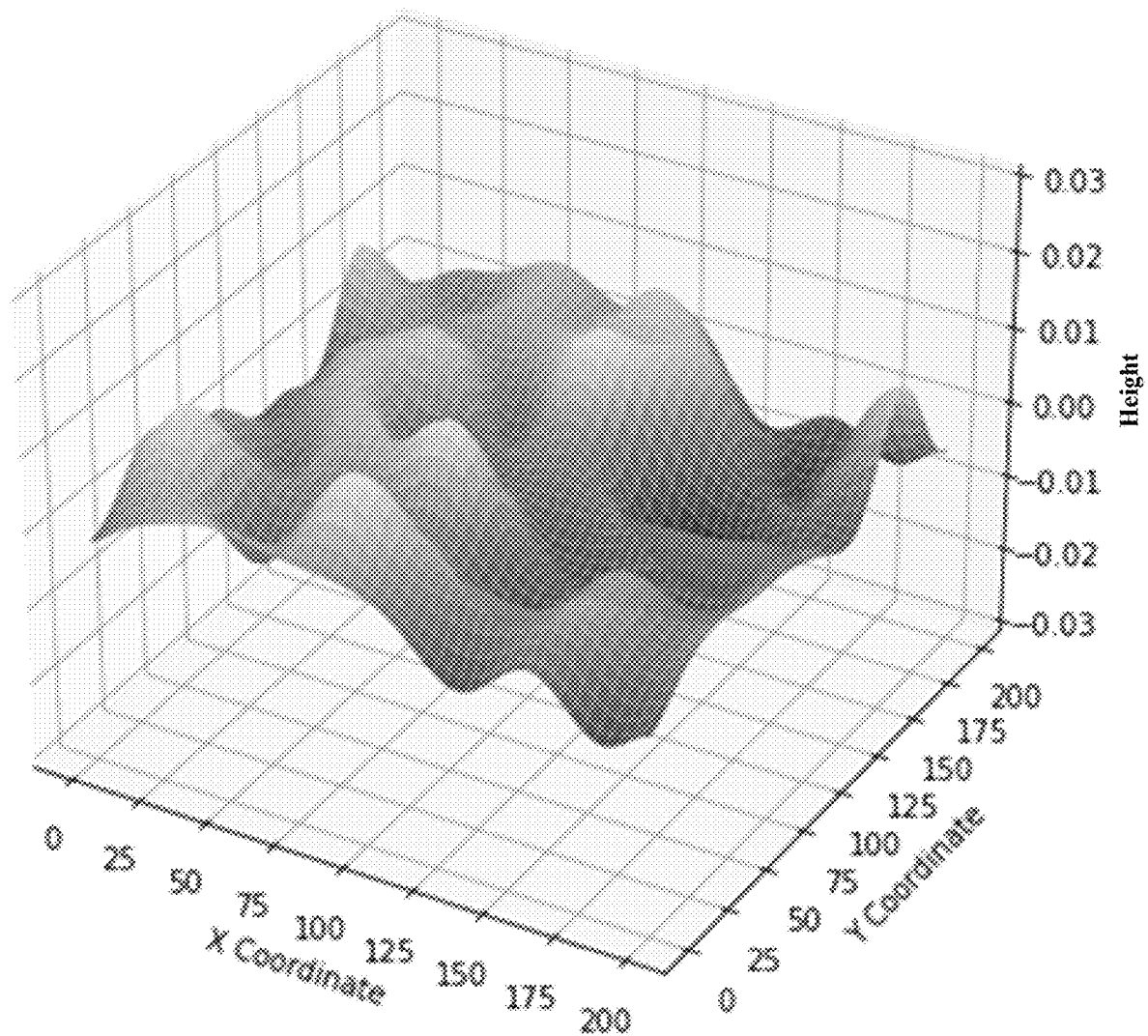
FIG. 2 is a three-dimensional image of the surface reconstructed based on the spatial frequency method.

As shown in FIG. 1, specifically, the following steps are included:

S1, according to the basic formula of the spatial frequency method, the three characteristic parameters of the spatial frequency are determined: the cutoff frequency N, the spectral index (frequency energy attenuation index) b, and the gain factor A;

$$f(x, y) =$$

$$A \cdot \sum_{m=-N}^{N} \sum_{n=-N}^{N} g(m, n) \cdot \frac{1}{\left(m^2 + n^2\right)^{\beta/2}} \cos(2\pi(mx + ny) + u(m, n))$$

where g(m,n) is a normal distribution function with a mean value of 0 and a standard deviation of 1; u(x,y) is a uniform distribution function on [0,2π];

x,y denotes the coordinate in x and y directions corresponding to any point on the rough surface; m,n denote the spatial frequency values in the x and y directions superimposed at any point on the rough surface, namely, m and n; β indicates the attenuation factor of amplitude with frequency in the spectrogram;

S2, three characteristic parameters of N, b, and A are set arbitrarily, and the surface topography is generated by using the formula in S1 (including a three-dimensional topography image, taking N=5, b=1, A=0.001 as an example, as shown in FIG. 2);

S3, in the set interval, the characteristic parameter combination of [N0, b0, A0] is randomly generated, and a two-dimensional array of the rough surfaces is generated accordingly.

The Python code for randomly generating characteristic parameter combinations is as follows:

N_range=(1,25) #the range of N
A_range-(0.001,0.010) #the range of A
b_range=(0.5, 2.0) #the range of b
N0=np.random.randint (N_range[0], N_range[1]+1)
A0=np.random.uniform (A_range[0], A_range[1])
b0=np.random.uniform (b_range[0], b_range[1])

Figure 3:
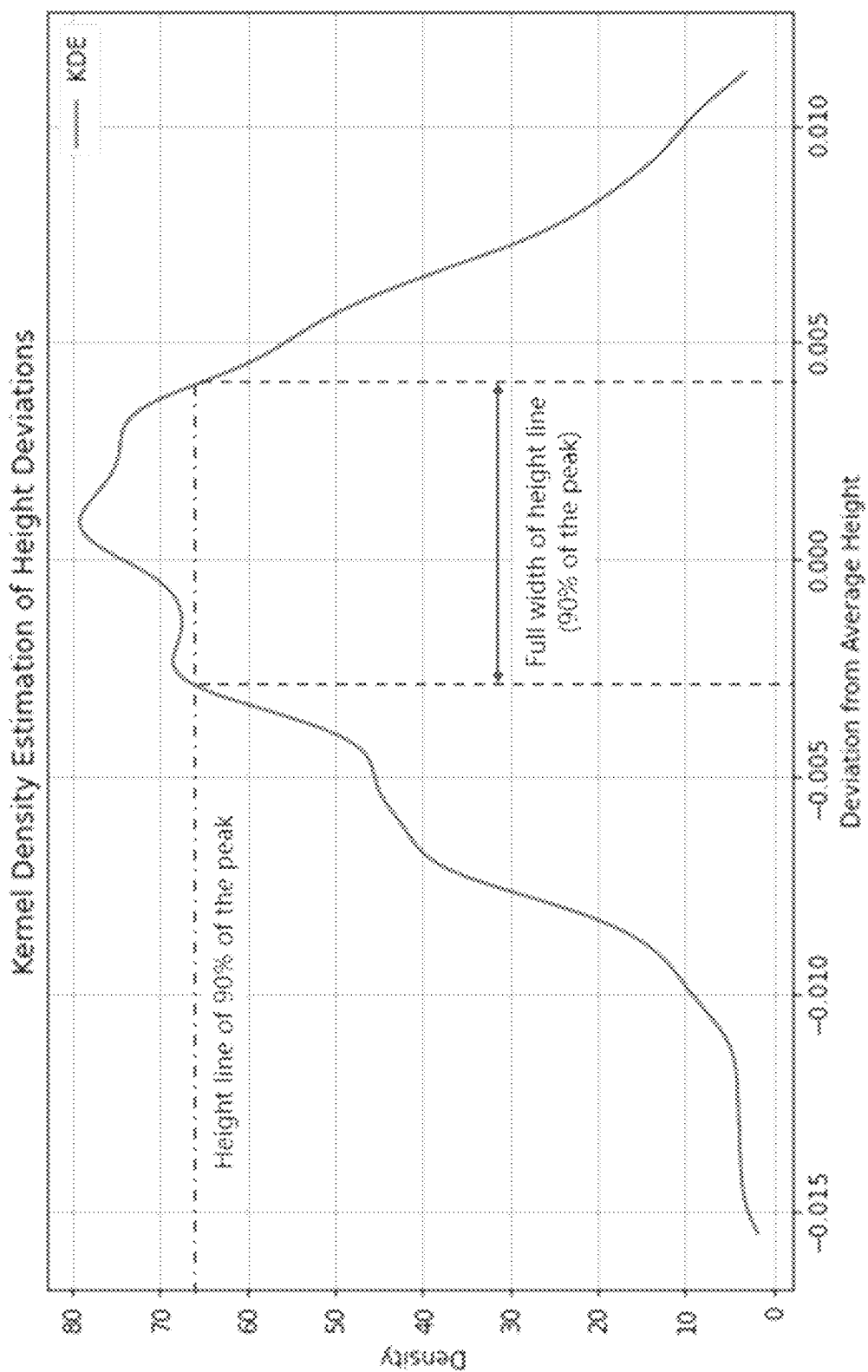
FIG. 3 is a height distribution map of a random rough surface.

S4, for the generated two-dimensional array, first its height distribution map is extracted (take N=5, b=1, A=0.001 as an example);

S5, according to the definition of FIG. 3, the full widths corresponding to 95%, 90%, 85%, 80%, 75%, 70%, 65%, 60%, 55%, 50%, 45%, 40%, 35%, 30%, 25%, 20%, 15%, 10%, 5% height lines in the height distribution map are extracted to form a one-dimensional array (arrays_1) of (1,19);

S6, the basic idea of two-dimensional Fourier transform is to decompose a complex two-dimensional signal into multiple simple waveforms (sine waves and cosine waves) with different frequencies and directions. The superposition of these waveforms can completely reconstruct the original signal, in image processing, this means that the image can be decomposed into the frequency of its composition. Using the two-dimensional Fourier transform method, the two-dimensional spectrum map corresponding to the two-dimensional array of the rough surface is drawn, and the three-dimensional image is shown in FIG. 4; for a two-dimensional function f(x,y), its two-dimensional Fourier transform F(u, v) is defined as:

$$F(u,v) \times \int_{-\infty}^{\infty} \int_{-28}^{\infty} f(x,y) e^{-i2\pi(ux+vy)} dx dy$$

where (x, y) is the coordinate in the spatial domain; (u,v) is the coordinate in the frequency domain; $e^{-i2\pi(ux+vy)}$ is the transformation kernel, denoting a complex form of rotation.

Figure 4:
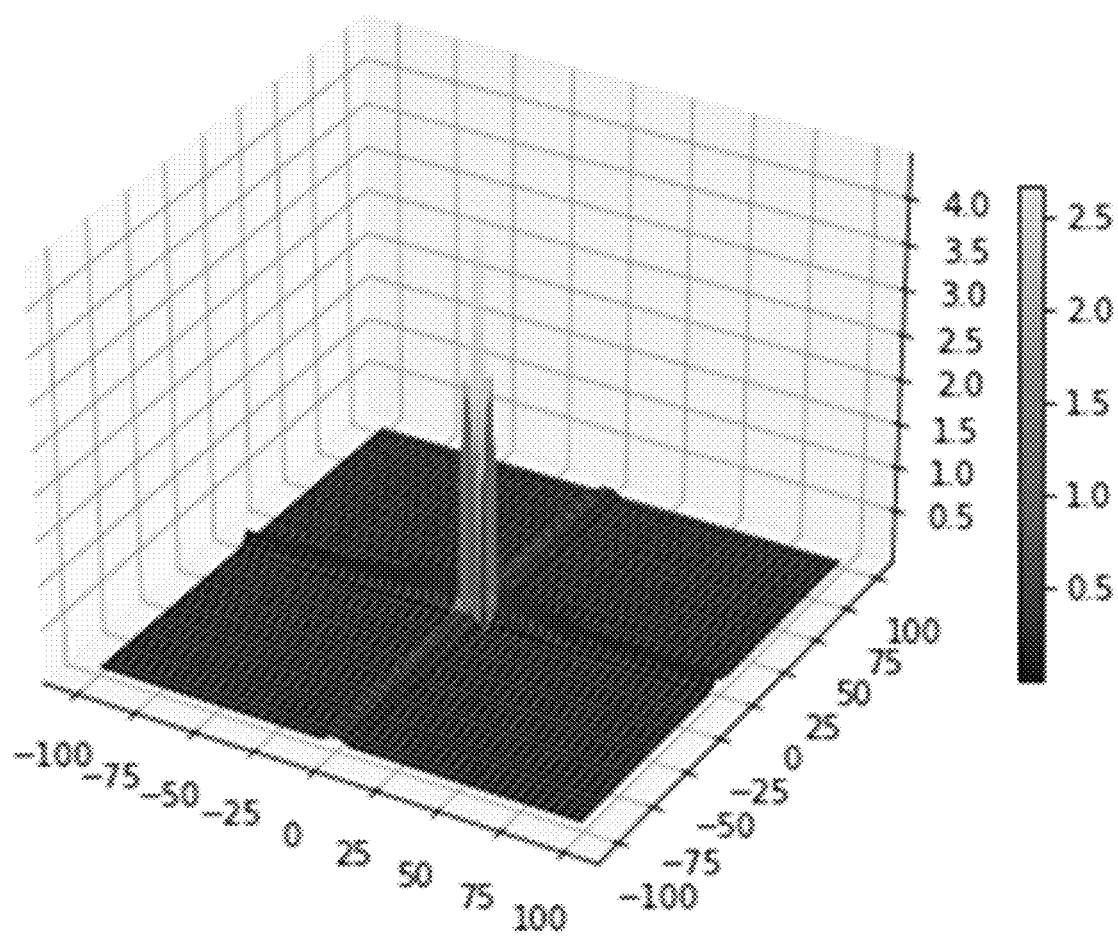
FIG. 4 is the three-dimensional images of the magnitude spectrum of the rough surface.

S7, according to the drawing result of FIG. 4, the origin (0, 0) in the two-dimensional spectrum is taken as the center, and the radii corresponding to the energy ratios of 95%, 90%, 85%, 80%, 75%, 70%, 65%, 60%, 55%, 50%, 45%, 40%, 35%, 30%, 25%, 20%, 15%, 10%, and 5% are extracted to form a one-dimensional array (arrays_2) of (1,19).

S8, the energy ratio and the corresponding radius are composed into (x, y), the spline curve is used to fit the continuous curve and the radius change rate of the corresponding position (95%, 90%, 85%, 80%, 75%, 70%, 65%, 60%, 55%, 50%, 45%, 40%, 35%, 30%, 25%, 20%, 15%, 10%, 5%) is extracted to form a one-dimensional array (arrays_3) of (1,19); the implementation method of its python code is:

```
def calculate spline slopes (radii, percentages):
    spline=UnivariateSpline (percentages [::–1], radii [::–1], s=0)
    slopes=spline.derivative (X (percentages [::–1]) #Calculate slopes at specific percentages
    return slopes
```

S9, three one-dimensional arrays of arrays_1, arrays_2, and arrays_3 are formed into a one-dimensional array, and an array [N, b, A] corresponding to the one-dimensional array is obtained;

S10, the Xgboost regression method (other machine learning methods with regression function can also be used) is used to train the model (model 1), the input of model 1 is a one-dimensional array with a (1,57) shape, corresponding to the height and spectral characteristics of surface topography; the output of Model 1 is a one-dimensional array with a (1,3) shape, corresponding to the spatial frequency characteristic parameters of the surface, the reference hyperparameters are set as follows (it can be adaptively adjusted according to specific problems).

```
model = xgb.XGBRegressor(
    objective='reg:squaredlogerror',
    n_estimators=500,
    learning_rate=0.05,
    max_depth=10
)
```

The above settings indicate that:
(1) The loss function of the model is square log error, this loss function is very sensitive to the smaller target value, which is suitable for the case when the predicted value and the actual value are both positive and relatively small.
(2) The number of decision trees in the model is 500. This parameter controls the complexity of the model and the length of the training process, the performance of the model can be improved when increasing this value, but the computational cost and the risk of overfitting are also increased.
(3) The learning rate of the model is 0.05. It determines the contribution of each tree to the final prediction. A smaller learning rate means that each step is updated less, which usually makes the model training more robust, but at the same time, more trees are needed for training to achieve better performance.
(4) The maximum depth of each tree is 10. The depth of the tree is an important parameter of model complexity. Trees with deeper depths can learn more complex patterns, but they are also easier to overfit.

S11, combined with the characteristics of the electrical contact interface structure, material, and contact form that need to be predicted, the static contact resistance is measured, and the surface morphology of the contact point is obtained by using the white light interferometer, the three-dimensional profiler, etc., and stored in a two-dimensional array of 200*200, the data pair formed is (static contact resistance, spatial frequency characteristic parameter of rough surface);

S12, using the model trained in S10 to extract the characteristic parameters (N, b, A) of the real rough surface, and using the machine learning regression method to train the correlation model between these three characteristic parameters and static contact resistance (Model 2), the training process of Model 2 is consistent with Model 1. However, it should be noted that the input of Model 2 is the spatial frequency characteristic parameter of the rough surface, and the output is the static contact resistance of the interface;

S13, model 1 is combined with model 2, the characteristic extraction, morphology reconstruction, and static contact resistance prediction for any rough surface can be realized.

Embodiment 2

The invention also provides a surface topography reconstruction system integrating machine learning and spatial frequency analysis, the surface topography reconstruction system integrating machine learning and spatial frequency analysis can be realized by performing the process steps of the surface topography reconstruction method integrating machine learning and spatial frequency analysis, that is, the surface topography reconstruction method integrating machine learning and spatial frequency analysis can be understood by technicians in this field as the preferred embodiment of the surface topography reconstruction system integrating machine learning and spatial frequency analysis.

According to the surface topography reconstruction system integrating machine learning and spatial frequency analysis in this invention, including module M1: the analytical formula of the spatial frequency method is used to generate a large number of two-dimensional arrays that symbolize rough surfaces; module M2: by analyzing the height distribution and the frequency energy ratio of the generated surface, combined with the machine learning method, the characteristic variable of the analytical formula is extracted; module M3: a test or a simulation method are integrated to establish the relationship between the characteristic parameter and the surface property for performance prediction and surface reconstruction in a specific scenario.

The module M1 includes:

According to the basic formula of the spatial frequency method, the cutoff frequency N, spectral index b, and gain factor A of the spatial frequency are determined, and the two-dimensional function is:

$$f(x, y) = A \cdot \sum_{m=-N}^{N} \sum_{n=-N}^{N} g(m, n) \cdot \frac{1}{\left(m^2 + n^2\right)^{\beta/2}} \cos(2\pi(mx + ny) + u(m, n))$$

where g(m,n) is the normal distribution function with a mean of 0 and a standard deviation of 1; u(x,y) is the uniform distribution function on [0, 2π]; x,y denotes the coordinate in x and y directions corresponding to any point on the rough surface; m,n denote the spatial frequency values in the x and y directions superimposed at any point on the rough surface, namely, m and n, β indicates the attenuation factor of amplitude with frequency in the spectrogram;

three characteristic parameters of N, b, and A are set arbitrarily to generate the surface topography, including a two-dimensional grayscale image and a three-dimensional topography image.

In the set interval of surface topography, the characteristic parameter combination of [N0, b0, A0] is randomly generated, and the two-dimensional array of the rough surface is generated accordingly.

The module M2 includes:

For the generated two-dimensional array, the height distribution map is extracted;

the full widths corresponding to height lines of 95%, 90%, 85%, 80%, 75%, 70%, 65%, 60%, 55%, 50%, 45%, 40%, 35%, 30%, 25%, 20%, 15%, 10% and 5% in the height distribution map are extracted to form the first one-dimensional array of (1,19);

the two-dimensional Fourier transform method is used, the two-dimensional spectrum corresponding to the two-dimensional array of the rough surface is drawn, for a two-dimensional function f(x,y), its two-dimensional Fourier transform F(u,v) is $$F(u,v) \times \int_{-\infty}^{\infty} \int_{-28}^{\infty} f(x,y) e^{-i2\pi(ux+vy)} dx dy$$

where (x,y) is the coordinate in the spatial domain; (u,v) is the coordinate in the frequency domain; $e^{-i2\pi(ux+vy)}$ is the transformation kernel, denoting the complex form of rotation;

the origin of (0,0) is taken in the two-dimensional spectrum as a center, the radii corresponding to extraction energy ratios of 95%, 90%, 85%, 80%, 75%, 70%, 65%, 60%, 55%, 50%, 45%, 40%, 35%, 30%, 25%, 20%, 15%, 10%, and 5% are extracted to form the second one-dimensional array of (1,19);

the energy ratio and the corresponding radius are composed to (x, y), the spline curve is used to fit the continuous curve, and the radius change rate of the corresponding position is extracted to form the third one-dimensional array of (1,19);

three one-dimensional arrays are formed into a one-dimensional array, and an array [N, b, A] corresponding to the one-dimensional array is obtained;

the regression method is used to train the model, the input of the model is a one-dimensional array with a (1,57) shape, corresponding to the height and spectral characteristics of the surface topography, and the output of the model is a one-dimensional array with a (1,3) shape, corresponding to the spatial frequency characteristic parameter of the surface.

The square logarithmic error is used as the loss function of the model; a number of decision trees in the model is 500, and the maximum depth of each tree is 10; the learning rate of the model is 0.05.

The static contact resistance is measured by integrating the structure, the material and the contact form characteristics of the electrical contact interface to be predicted, and the surface morphology of the contact point is obtained by using a white light interferometer and a three-dimensional profilometer, the surface morphology of the contact point is stored in a two-dimensional array of 200*200, and formed data pairs are (static contact resistance, spatial frequency characteristic parameter of the rough surface);

the trained model is used to extract the characteristic parameters (N, b, A) of the real rough surface, and the machine learning regression method is used again to train the correlation model between these three characteristic parameters and the static contact resistance, the input of the correlation model is the spatial frequency characteristic parameter of the rough surface, and the output is the static contact resistance of the interface.

The technical personnel in this field know that in addition to the system, device and each module provided by the invention realized by the pure computer-readable program code, the system, device and each module provided by the invention can be realized by logic programming of the method steps in the form of logic gates, switches, special integrated circuits, programmable logic controllers and embedded microcontrollers. Therefore, the system, device, and its modules provided by the invention can be considered as a hardware component, and the modules included in it for implementing various programs can also be regarded as a structure within the hardware component; the modules used to implement various functions can also be regarded as software programs that can implement methods or structures within hardware components.

The specific embodiments of the invention are described above. It should be understood that the invention is not limited to the above specific implementation methods, technical personnel in this field can make various changes or modifications within the scope of claims, which does not affect the substance of the invention. In the case of non-conflict, the embodiments of the application and the characteristics of the embodiments can be arbitrarily combined.

What is claimed is:

1. A surface topography reconstruction method integrating machine learning and spatial frequency analysis, comprising:
    step 1: using an analytical formula of a spatial frequency method to generate a large number of two-dimensional arrays that symbolize rough surfaces;
    step 2: by analyzing a height distribution and a frequency energy ratio of a generated surface, combined with a machine learning method, extracting a characteristic variable of the analytical formula; and
    step 3: integrating a test or a simulation method to establish a relationship between a characteristic parameter and a surface property for performance prediction and surface reconstruction;
    wherein step 1 comprises:
    according to a basic formula of the spatial frequency method, determining a cutoff frequency N, a spectral index b, and a gain factor A of a spatial frequency, and a two-dimensional function is $$f(x, y) = A \cdot \sum_{m=-N}^{N} \sum_{n=-N}^{N} g(m, n) \cdot \frac{1}{(m^2 + n^2)^{\beta/2}} \cos(2\pi(mx + ny) + u(m, n))$$

wherein g(m,n) is a normal distribution function with a mean of 0 and a standard deviation of 1; u(m,n) is a uniform distribution function on [0, 2π]; x,y denotes a coordinate in x and y directions corresponding to any point on the rough surface; m,n denote spatial frequency values in the x and y directions superimposed at any point on the rough surface, namely, m and n; β indicates an attenuation factor of amplitude with frequency in a spectrogram;
    setting three characteristic parameters of N, b, and A arbitrarily to generate a surface topography, comprising a two-dimensional grayscale image and a three-dimensional topography image; and
    in a set interval of the surface topography, generating a characteristic parameter combination of [N0, b0, A0] randomly, and generating the two-dimensional array of the rough surface accordingly;
    wherein step 2 comprises:
    for a generated two-dimensional array, extracting a height distribution map;
    extracting full widths corresponding to height lines of 95%, 90%, 85%, 80%, 75%, 70%, 65%, 60%, 55%, 50%, 45%, 40%, 35%, 30%, 25%, 20%, 15%, 10% and 5% in the height distribution map to form a first one-dimensional array of (1,19);
    using a two-dimensional Fourier transform method, and drawing a two-dimensional spectrum corresponding to the two-dimensional array of the rough surface, wherein a two-dimensional Fourier transform F(u,v) of a two-dimensional function f(x,y) is:

$$F(u,v) \times \int_{-\infty}^{\infty} \int_{-28}^{\infty} f(x,y) e^{-i2\pi(ux+vy)} dx dy$$

wherein (x,y) is a coordinate in a spatial domain; (u,v) is a coordinate in a frequency domain; and $e^{-i2\pi(ux+vy)}$ is a transformation kernel, denoting a complex form of rotation;
    taking an origin of (0,0) in the two-dimensional spectrum as a center, extracting radii corresponding to extraction energy ratios of 95%, 90%, 85%, 80%, 75%, 70%, 65%, 60%, 55%, 50%, 45%, 40%, 35%, 30%, 25%, 20%, 15%, 10% and 5% to form a second one-dimensional array of (1,19);
    composing an energy ratio and a corresponding radius to (x, y), using a spline curve to fit a continuous curve, and extracting a radius change rate of a corresponding position to form a third one-dimensional array of (1,19);
    allowing three one-dimensional arrays to be formed into a one-dimensional array, and obtaining array [N, b, A] corresponding to the one-dimensional array; and
    using a regression method to train a model, wherein an input of the model is a one-dimensional array with a (1,57) shape, corresponding to height and spectral characteristics of the surface topography, and an output of the model is a one-dimensional array with a (1,3) shape, corresponding to spatial frequency characteristic parameters of the rough surface.

2. The surface topography reconstruction method integrating machine learning and spatial frequency analysis according to claim 1, wherein a square logarithmic error is used as a loss function of the model; a number of decision trees in the model is 500, and a maximum depth of each tree is 10; and a learning rate of the model is 0.05.

3. The surface topography reconstruction method integrating machine learning and spatial frequency analysis according to claim 1, wherein a static contact resistance is measured by integrating a structure, a material, and contact form characteristics of an electrical contact interface to be predicted, the surface morphology of a contact point is obtained by using a white light interferometer and a three-dimensional profilometer, the surface morphology of the contact point is stored in a two-dimensional array of 200*200, and formed data pairs are the static contact resistance and the spatial frequency characteristic parameters of the rough surface; and
    a trained model is used to extract a characteristic parameter (N, b, A) of a real rough surface, and a machine learning regression method is used again to train a correlation model between the three characteristic parameters and the static contact resistance, wherein an input of the correlation model is the spatial frequency characteristic parameters of the rough surface, and an output of the correlation model is the static contact resistance of the electrical contact interface.

* * * * *